United States Patent [19]
Bily

[11] Patent Number: 6,135,527
[45] Date of Patent: Oct. 24, 2000

[54] CARGO COMPARTMENT ORGANIZER

[76] Inventor: Marc Bily, 19480 Bauer Cir., Hastings, Minn. 55033-9640

[21] Appl. No.: 09/186,258

[22] Filed: Nov. 5, 1998

[51] Int. Cl.[7] .................................................. B62D 33/02
[52] U.S. Cl. ....................... 296/37.6; 296/24.1; 296/37.5; 410/121; 410/129; 410/140; 410/141
[58] Field of Search ..................................... 410/121, 129, 410/130, 139, 140, 141, 142; 224/42.33, 42.34, 403; 296/24.1, 37.5, 37.6, 39.2; 220/532, 533, 544, 549, 552; 49/142, 501

[56] References Cited

U.S. PATENT DOCUMENTS

| | | | |
|---|---|---|---|
| 1,013,630 | 1/1912 | Wiesner | 220/532 X |
| 4,358,035 | 11/1982 | Heidecker | 220/533 |
| 4,844,305 | 7/1989 | McKeenly | 224/42.42 |
| 4,875,730 | 10/1989 | Justice | 296/37.5 |
| 5,005,727 | 4/1991 | Roth | 220/532 X |
| 5,265,993 | 11/1993 | Wayne | 410/129 |
| 5,526,972 | 6/1996 | Frazier et al. | 224/539 |
| 5,597,193 | 1/1997 | Conner | 296/37.6 |
| 5,882,058 | 3/1999 | Karrer | 296/39.2 |
| 5,931,632 | 8/1999 | Dongilli et al. | 414/522 |

*Primary Examiner*—D. Glenn Dayoan
*Assistant Examiner*—S. Carpenter

[57] ABSTRACT

A cargo compartment organizer for providing an easily assembled and disassembled cargo organizer includes a bottom panel, side panels, and a top panel having at least one hinged lid, wherein the bottom, top and side panels are coupled together by resilient tracks. In an alternate embodiment, the bottom panel and side panels include cutouts to accommodate wheel wells such as are commonly found in pick-up style vehicles.

10 Claims, 3 Drawing Sheets

CARGO COMPARTMENT ORGANIZER

BACKGROUND OF THE INVENTION

1. Field of the Invention

The present invention relates to cargo organizers and more particularly pertains to a new cargo compartment organizer having resilient assembly tracks for providing an easily assembled cargo organizer.

2. Description of the Prior Art

The use of cargo organizers is known in the prior art. More specifically, cargo organizers heretofore devised and utilized are known to consist basically of familiar, expected and obvious structural configurations, notwithstanding the myriad of designs encompassed by the crowded prior art which have been developed for the fulfillment of countless objectives and requirements.

Known prior art cargo organizers include U.S. Pat. No. 4,832,394; U.S. Pat. No. 3,512,828; U.S. Pat. No. 5,687,895; U.S. Pat. No. 2,989,340; U.S. Pat. No. 3,765,717; U.S. Pat. No. 4,733,898; U.S. Pat. No. 5,441,183; U.S. Pat. No. 5,564,773; U.S. Pat. No. 5,526,972; U.S. Pat. No. 4,469,364; U.S. Pat. No. 4,917,429; U.S. Pat. No. 4,844,305; U.S. Pat. No. 5,697,742; U.S. Pat. No. 4,749,226; and U.S. Pat. No. Des. 329,908.

While these devices fulfill their respective, particular objectives and requirements, the aforementioned patents do not disclose a new cargo compartment organizer. The inventive device includes a bottom panel, side panels, and a top panel having at least one hinged lid, wherein the bottom, top and side panels are coupled together by resilient tracks.

In these respects, the cargo compartment organizer according to the present invention substantially departs from the conventional concepts and designs of the prior art, and in so doing provides an apparatus primarily developed for the purpose of providing an easily assembled cargo organizer.

SUMMARY OF THE INVENTION

In view of the foregoing disadvantages inherent in the known types of cargo organizers now present in the prior art, the present invention provides a new cargo compartment organizer construction wherein the same can be utilized for providing an easily assembled cargo organizer.

The general purpose of the present invention, which will be described subsequently in greater detail, is to provide a new cargo compartment organizer apparatus and method which has many of the advantages of the cargo organizers mentioned heretofore and many novel features that result in a new cargo compartment organizer which is not anticipated, rendered obvious, suggested, or even implied by any of the prior art cargo organizers, either alone or in any combination thereof.

To attain this, the present invention generally comprises a bottom panel, side panels, and a top panel having at least one hinged lid, wherein the bottom, top and side panels are coupled together by resilient tracks.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cargo compartment organizer apparatus and method which has many of the advantages of the cargo organizers mentioned heretofore and many novel features that result in a new cargo compartment organizer which is not anticipated, rendered obvious, suggested, or even implied by any of the prior art cargo organizers, either alone or in any combination thereof.

It is another object of the present invention to provide a new cargo compartment organizer that may be easily and efficiently manufactured and marketed.

It is a further object of the present invention to provide a new cargo compartment organizer that is of a durable and reliable construction.

An even further object of the present invention is to provide a new cargo compartment organizer which is susceptible of a low cost of manufacture with regard to both materials and labor, and which accordingly is then susceptible of low prices of sale to the consuming public, thereby making such cargo compartment organizer economically available to the buying public.

Still yet another object of the present invention is to provide a new cargo compartment organizer which provides in the apparatuses and methods of the prior art some of the advantages thereof, while simultaneously overcoming some of the disadvantages normally associated therewith.

Still another object of the present invention is to provide a new cargo compartment organizer for providing an easily assembled cargo organizer.

Yet another object of the present invention is to provide a new cargo compartment organizer which includes a bottom panel, side panels, and a top panel having at least one hinged lid, wherein the bottom, top and side panels are coupled together by resilient tracks.

Still yet another object of the present invention is to provide a new cargo compartment organizer that is easily assembled and broken down without the need for screws, tools or other implements.

Even still another object of the present invention is to provide a new cargo compartment organizer that provides a top having a substantially planar upper surface for resting objects thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
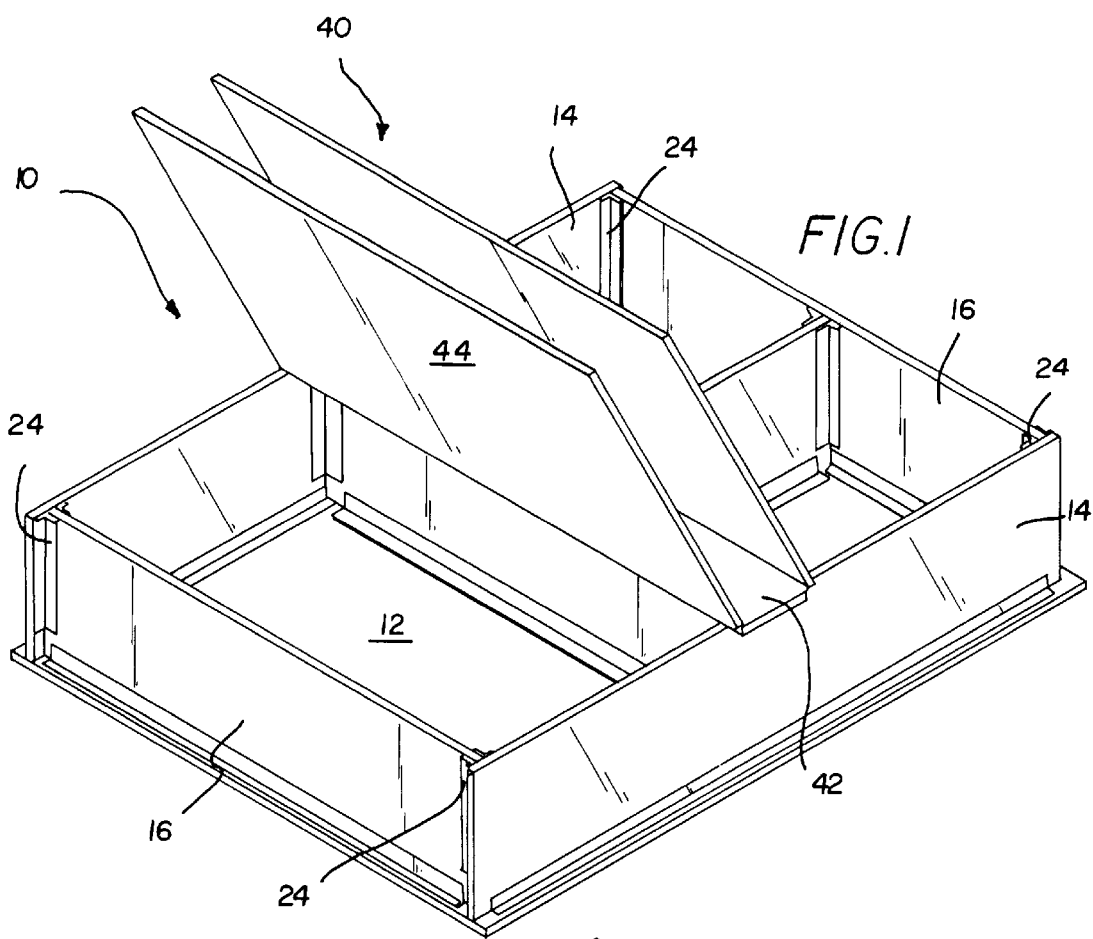
FIG. 1 is a perspective view of a new cargo compartment organizer according to the present invention.
Figure 2:
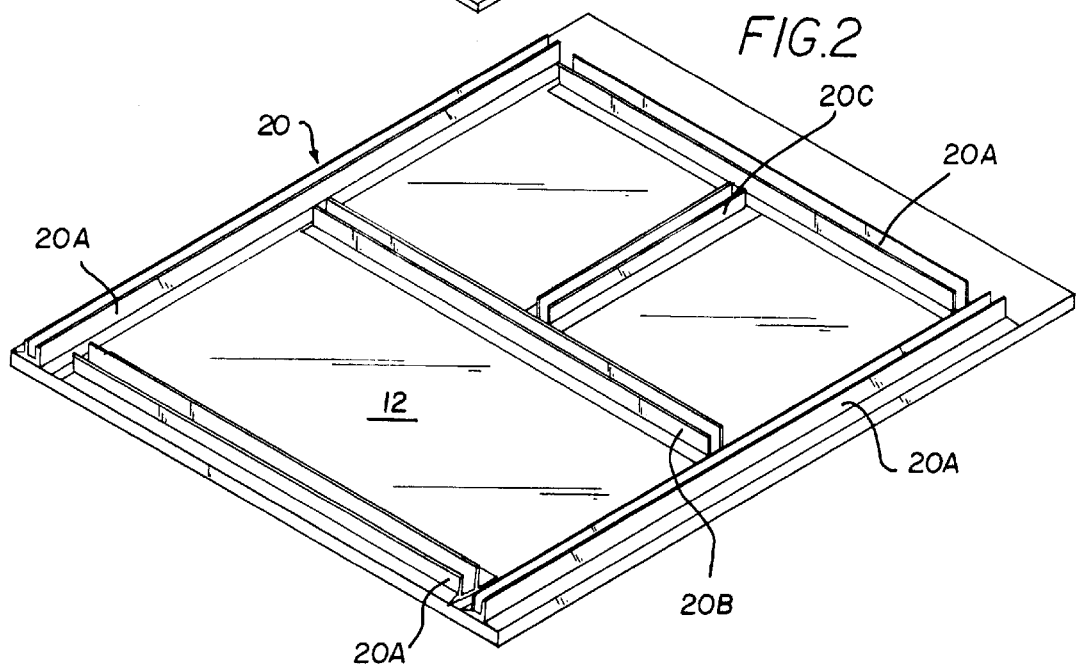
FIG. 2 is a perspective view of the bottom panel and bottom tracks of the present invention.

With reference now to the drawings, and in particular to FIGS. 1 through 6 thereof, a new cargo compartment organizer embodying the principles and concepts of the present invention and generally designated by the reference numeral 10 will be described.

As best illustrated in FIGS. 1 through 7, the cargo compartment organizer 10 comprises a planar base plate 12 designed to cover a surface of the cargo compartment of the vehicle. A first plurality of resilient tracks 20 are coupled to the planar base 12, each of the plurality of resilient tracks 20 has a pair of substantially parallel extensions 22 positioned in a spaced relationship with respect to each other. The extensions 22 are disposed outwardly from a base portion 28. A plurality of outer perimeter resilient tracks 20A are positioned to define a substantially rectangular pattern proximate an outer perimeter of the planar base plate 12.

A first interior resilient track 20B is positioned such that the first interior resilient track 20B substantially bisects the rectangular pattern to define two rectangular areas.

A second interior resilient track 20C is positioned such that the second interior resilient track 20C substantially bisects one of the two rectangular areas.

A pair of oppositely positioned side walls 14 are insertable into a first pair of the outer perimeter resilient tracks 20A. Each side wall 14 has a pair of outer resilient side wall tracks 24 positioned at respective ends of each side wall 14 such that opposing outer side wall tracks 24 from each side wall are aligned with a second pair of the outer perimeter resilient tracks 20.

A pair of cross walls 16 are insertable into the opposing outer resilient side wall tracks 24 and the second pair of outer perimeter resilient tracks 20A such that the side walls 14 and the cross walls 16 define an interior space.

Each of the side walls 14 also includes a medial resilient side wall track 26 aligned with the first interior resilient track 20B. A first interior cross member 30 is insertable into the medial resilient side wall tracks 26 and the first interior resilient track 20B.

The first interior cross member 30 includes a resilient cross member track 32 and one of the cross walls 16 includes a resilient cross wall track 34. The cross member track 32 and the cross wall track 34 are aligned with the second interior track 20C.

A second interior cross member 36 is insertable into the cross wall track 32, the cross member track 34 and the second interior track 20C such that the side walls 14, cross walls 16, and the first and second interior cross members, 20B and 20C, define three interior compartments in the interior space.

A top assembly 40 has a central stationary portion 42 and a pair of lids 44 hingedly attached to opposite sides of the stationary portion 44. A hinge 50 has opposite ends 50A, one end 50A fixedly inserted into a slot 42A in the stationary portion 42 and the other end 50A fixedly inserted into slot 44A of lid 44.

The stationary portion 42 includes a plurality of resilient top tracks 46 configured to engage a portion of each side wall 16 and the first interior cross member 30 such that the top assembly 40 is positioned over the three interior compartments. Each lid 44 has a recessed handle 48 designed for receiving fingers of a hand of a user for facilitating lifting of the lid 44.

Although varying in position and orientation, all the above mentioned resilient tracks are preferably of the same general shape and construction.

It is also preferred that the upper surfaces of the base plate and the top assembly include a covering such as carpeting to either match or compliment the color scheme of the vehicle.

Figure 3:
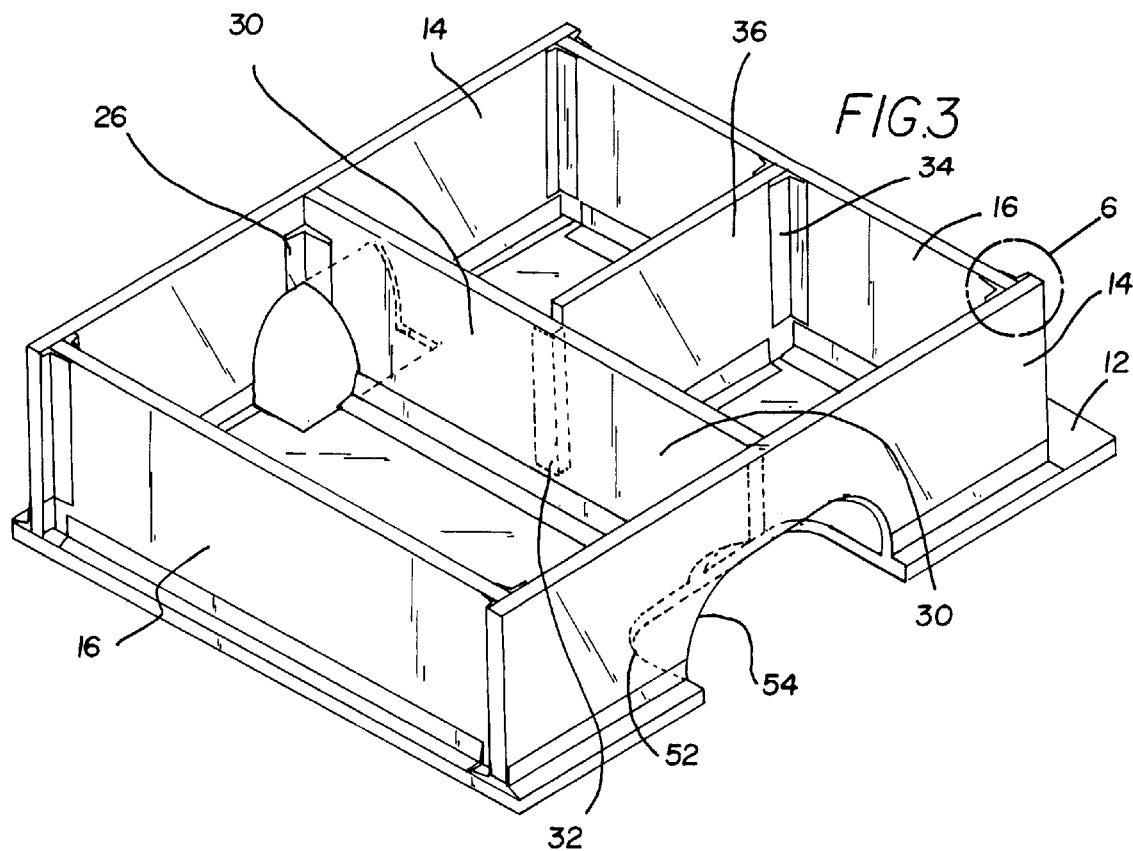
FIG. 3 is a perspective view of the bottom and side panels of an alternate embodiment of the present invention.
Figure 4:
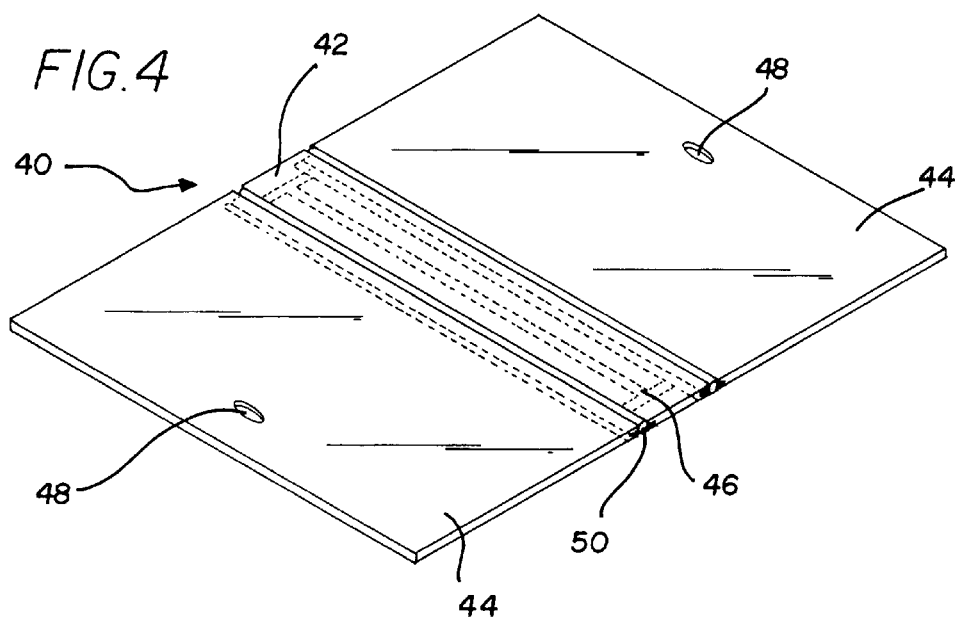
FIG. 4 is a top perspective view of the top assembly of the present invention.
Figure 5:
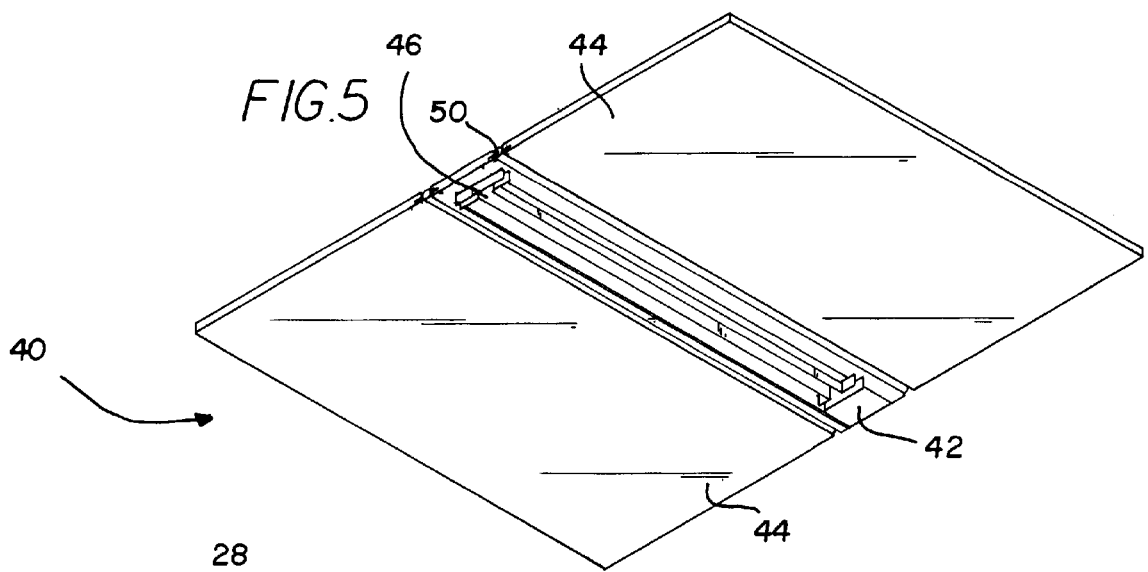
FIG. 5 is a bottom perspective view of the top assembly of the present invention.
Figure 6:
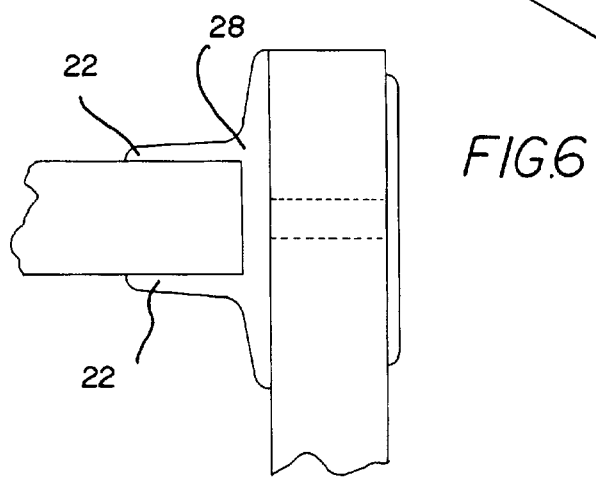
FIG. 6 is a top view of the resilient track coupled to a side wall of the present invention.
Figure 7:
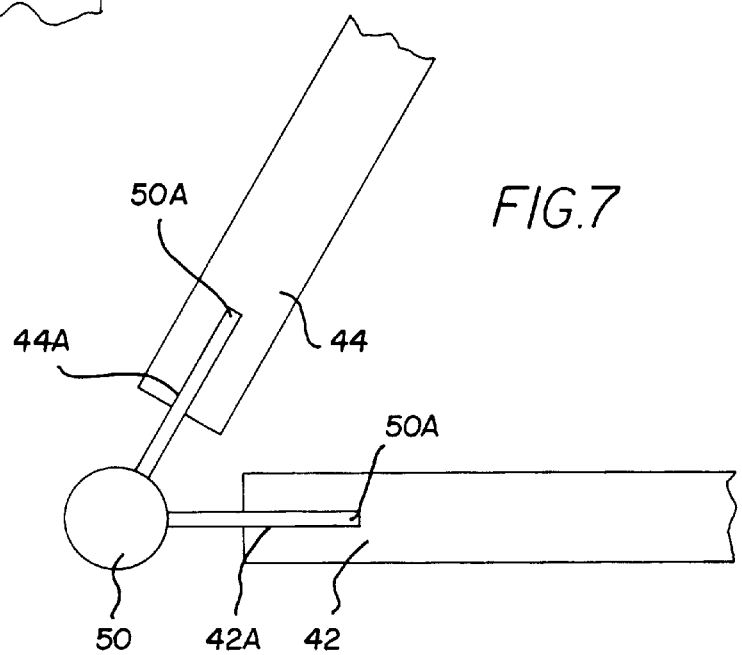
FIG. 7 is a side view of the hinge connecting the lid to the stationary portion of the top assembly.

Further, in an alternate embodiment shown in FIG. 3, the base plate and side walls can include cutouts, 52 and 54 respectively, to accommodate wheel wells extending into the cargo compartment of the vehicle, as is commonly found in pick-up style trucks.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An organizer for a cargo compartment of a vehicle, the organizer comprising a bottom panel configured to conform generally to a shape of the cargo compartment of the vehicle;

a plurality of resilient tracks positioned on said bottom panel;

a plurality of walls inserted into said tracks positioned on said bottom panel to define a plurality of compartments;

said plurality of side walls being engaged to each other by insertion of said plurality of side walls into a plurality of resilient side tracks coupled to said side walls; and a top having a stationary portion and at least one hinged lid, said stationary portion having at least one resilient top track coupled thereto for engaging said top to at least one of said side walls.

2. The organizer of claim 1, wherein the bottom panel is configured to include a pair of oppositely positioned bottom cutouts, each bottom cutout being adapted for abutting a wheel well protruding upwardly from a bottom of the cargo compartment of the vehicle.

3. The organizer of claim 2, wherein an opposing pair of said plurality of side walls each include a side wall cutout adapted for snugly abutting a top surface of the wheel well of the vehicle.

4. The organizer of claim 1, wherein each of said resilient tracks includes a pair of substantially parallel extensions positioned in a spaced relationship with respect to each other, said extensions being disposed outwardly from a base portion of each of said first plurality of resilient tracks.

5. The organizer of claim 1, wherein said hinged lid is coupled to said stationary portion of said top by a first side of a hinge fixedly inserted into a slot in the stationary portion and a second side of the hinge being fixedly inserted into a slot in the lid.

6. The organizer of claim 1 further comprising a recessed handle in said lid, said recessed handle being adapted for receiving fingers of a hand of a user for facilitating lifting of said lid.

7. The organizer of claim 4, wherein the base portion of each resilient track extends outwardly from said extensions such that said extensions extend from a medial portion of said base portion.

8. The organizer of claim 1, wherein an upper surface of the bottom panel and an upper surface of the top assembly each include a protective covering for enhancing the appearance of the organizer when positioned in the vehicle and for preventing damage to the upper surfaces of the bottom panel and the top assembly.

9. The organizer of claim 8, wherein the protective covering is carpet adapted for color coordinating with a color scheme of the vehicle.

10. An organizer for a cargo compartment of a vehicle, the organizer comprising:

a planar base plate being generally configured to cover a surface of the cargo compartment of the vehicle;

a first plurality of resilient tracks coupled to said planar base, each of said plurality of resilient tracks including a pair of substantially parallel extensions positioned in a spaced relationship with respect to each other, said extensions being disposed outwardly from a base portion of each of said first plurality of resilient tracks, said first plurality of resilient tracks including a plurality of outer perimeter resilient tracks positioned to define a substantially rectangular pattern proximate an outer perimeter of said planar base plate, said first plurality of resilient tracks including a first interior resilient track positioned such that said first interior resilient track substantially bisects said rectangular pattern to define two rectangular areas;

said first plurality of resilient tracks including a second interior resilient track positioned such that said second interior resilient track substantially bisects one of said two rectangular areas;

a pair of oppositely positioned side walls insertable into a first pair of said outer perimeter resilient tracks, each side wall having a pair of outer resilient side wall tracks positioned at respective ends of each side wall such that opposing outer side wall tracks from each side wall are aligned with a second pair of said outer perimeter resilient tracks;

a pair of cross walls insertable into said opposing outer resilient side wall tracks and said second pair of outer perimeter resilient tracks, such that said side walls and said cross walls define an interior space;

wherein each of said side walls includes a medial resilient side wall track aligned with said first interior resilient track;

a first interior cross member being insertable into said medial resilient side wall tracks and said first interior resilient track;

wherein said first interior cross member includes a resilient cross member track and one of said cross walls includes a resilient cross wall track, said cross member track and said cross wall track being aligned with said second interior track;

a second interior cross member being insertable into said cross wall track, said cross member track and said second interior track such that said side walls, cross walls, and said first and second interior cross members define three interior compartments in said interior space;

a top assembly including a central stationary portion and a pair of lids hingedly attached to opposite sides of said stationary portion;

wherein said stationary portion includes a plurality of resilient top tracks configured to engage a portion of each side wall and said first interior cross member such that said top assembly is positioned over said three interior compartments; and each lid including a recessed handle adapted for receiving fingers of a hand of a user for facilitating lifting of said lid.

* * * * *